United States Patent [19]

D'Agrosa

[11] 4,394,838
[45] Jul. 26, 1983

[54] BURNING CELL FOR SOLID WASTE FUEL MATERIALS

[76] Inventor: David D. D'Agrosa, Boulevard de la Luz 209, Mexico City 20, Mexico

[21] Appl. No.: 257,978

[22] Filed: Apr. 27, 1981

[30] Foreign Application Priority Data

Apr. 30, 1980 [MX] Mexico .................... 182176

[51] Int. Cl.³ .................................. F23B 7/00
[52] U.S. Cl. ................................ 110/234; 110/213; 110/214
[58] Field of Search ............... 110/213, 210, 212, 214, 110/235, 244, 346, 234

[56] References Cited

U.S. PATENT DOCUMENTS

| | | | |
|---|---|---|---|
| 2,602,409 | 7/1952 | Dennis | 110/244 |
| 3,195,608 | 7/1965 | Voorheis et al. | 110/210 X |
| 4,023,508 | 5/1977 | Cantrell, Jr. et al. | 110/212 |
| 4,177,740 | 12/1979 | Lamb et al. | 110/213 |

*Primary Examiner*—Edward G. Favors

*Attorney, Agent, or Firm*—Darby & Darby

[57] ABSTRACT

A burning cell for solid waste fuel materials comprises a lower cylindrical chamber where a pile of said waste fuel is burned with the aid of a plurality of horizontal arrays of tuyeres that feed the air against said pile, and an upper cylindrical chamber separated from said lower chamber by a centrally opened partition, said upper chamber having a helical array of downwardly inwardly and sidewardly inclined tuyeres to produce an outer descending whirlpool of air which reverses direction at said partition to form a central ascending whirlpool of air, said upper chamber having a centrally opened roof for exhausting said air, whereby the large particle fuel is totally burned in said pile in the lower chamber, whereas the partially burned fines are entrained by the air from said lower chamber tuyeres and passed upwardly into the central ascending whirlpool through said upper chamber to furtherly burn said fines without any contact between said fines and the walls of said upper chamber.

11 Claims, 5 Drawing Figures

BURNING CELL FOR SOLID WASTE FUEL MATERIALS

FIELD OF THE INVENTION

The present invention refers to a burning cell for solid waste fuel materials and, more particularly, it is related to a burning cell for high efficiency combustion of solid waste fuels, particularly bagasse, and more particularly bagasse having proportions of pith.

BACKGROUND OF THE INVENTION

As is well known in the art, the burning of solid waste fuels, which are materials with a high moisture and volatile content, is generally accomplished in three overlapping stages, which must be taken into consideration in the design of a suitable furnace for combustion thereof.

The first stage is one for heat absorption in which the moisture in the fuel is evaporated, during which time the temperature of the fuel does not exceed the water boiling temperature at the site of operation.

The second stage is also a heat absorbing stage and thereafter a heat generating stage and occurs when the volatiles are distilled off. In other words, after the evaporation of moisture is completed and with the continued addition of heat, the temperature of the fuel rises. At a temperature of about 600° C. in the presence of air, the volatile matter burns and generates heat.

The rate of moisture evaporation and the distillation of volatiles depend upon the rate with which heat is supplied and also upon the sizing of the fuel. A reasonably small particle size provides a larger surface area and decreases the amount of material through which the heat must be transmitted by conduction.

The third stage occurs when the residual carbon reaches the ignition temperature and burns in the presence of air. Again, in this particular instance, it may be easily seen that the particle sizing of the fuel has a definite influence on the rate of combustion.

As the volatile matter content of these waste or refuse solid fuels is within the range of from 12 to 85% by weight of the total weight of the fuel, it is apparent that the major part of the combustion, which would consume much of the fixed carbon, occurs above the fuel bed, and consequently, the bulk of the combustion air, according to the prior art assumptions, should be supplied in this area.

In order to maintain a suitable environment for a fast evaporation of moisture and distillation of volatiles, it is also apparent that the use of refractory arches and walls is of considerable importance to provide the maximum amount of heat reflected towards the fuel, such that it is shaded from the black or heat-absorbing surfaces.

In order to achieve the above mentioned type of combustion, numerous types of furnaces and burning cells have been used in accordance with the prior art and a historical reviewal of the development of furnaces for solid waste materials, particularly bagasse, has been the subject matter of serious studies and a definite improvement has been arrived at in the design of furnaces and combustion cells therefor.

Thus, before the year 1885, all the solid waste fuels, such as bagasse, were transported from the generation site to fields where the same were sun dried and thereafter were returned to the plant for burning. This rather intricate procedure was required by the bagasse producing mills and the like, because it was required to supply fuel to said mills and the bagasse or similar solid waste materials were considered as a basic heat source. Unfortunately, all the furnaces existing at the time were uncapable of burning such fuels when in the "green" state.

In 1886, the first furnace for burning green bagasse ed and patented by Samuel Fiske. This furnace comprised an oven provided with a horizontal grate built with bars on which the bagasse was burned. The oven was frequently connected to various existing types of boilers by means of flues for combustion gases. The bagasse was fed through feed chutes on the top of the oven, forming two conical piles on the flat grates and refractory materials were installed in all the available areas to provide the maximum amount of radiant and reflected heat for drying and gasifying the volatile materials. This type of ovens for burning green bagasse, while constituting a great advance in the particular art, showed serious drawbacks, inasmuch as on the one hand the ash, in combination with the residual juices in the bagasse, formed a plastic clinker which was very difficult to handle on the flat grates and the use of pre-heated air aggravated the problem, whereby the pre-heating of said air was limited to about 125° C. On the other hand, with a rectangular furnace and conical fuel piles, it is readily apparent that the distribution of fuel on the flat grates was variable and resulted in the formation of "blow holes", wherein no fuel material was arranged on the fuel bed, thereby causing the dilution of the forced draft air which was not contacted with the combustion products, and the flat grate furnaces of Fiske were therefore regarded as highly inefficient.

Later, Frederick Cook introduced a furnace for burning green bagasse comprising a hearth furnace wherein the problems connected with the horizontal grate furnace of Fiske were solved. The hearth was divided into two or more cells in the shape of a horseshoe, whereby these furnaces were named horseshoe furnaces. The cone of fuel material was intimately surrounded by refractory material and, therefore, the efficiency of the furnace was increased. The horseshoe shaped cells were fed through feed chutes at the top of the furnace such as the Fiske burners. The combustion air was forced inwardly and above the fuel cone through tuyeres located in the walls of the cell, from an air plenum which virtually surrounded the lower portion of each cell.

The top of the furnace above the horseshoe cells, had an inclined portion forming a duct which created a turbulence before the combustion gases entered into the chamber of the boiler or similar furnace and, therefore, this increased the efficiency of admixture between the combustion gases and air in order to accomplish a more complete combustion. However, these furnaces, while considerably increasing the efficiency of the furnaces of Fiske, also showed serious drawbacks due to the fact that the volume of the furnace was inadequate and that this type of furnace frequently produced a condition of heavy scale that could not be easily removed from the combustion chambers. Also, all the fine particles of fuel were entrained into the combustion chamber of the boiler and were not generally burned in a complete manner, whereby they adhered in the form of crusts very difficult to be removed on the walls of the boilers and on the tubes thereof, with the consequent disadvantages.

Some time later, the step grate burner or furnace was developed, which comprised a combustion chamber having very steep grates which adopted the form of step ladders, where the combustion air passed through relatively large openings between the steps of the grate in a horizontal direction. This grate suitably supported the fuel and avoided the necessity of small and vertical openings for air as was necessary with the horizontal grate and which frequently were plugged by masses of clinker resulting in an eventual destruction. In this particular instance, even when the possibility of blow holes was minimized, nevertheless said posibility was a potential source of dilution of combustion gases. The bagasse was fed on the upper drying hearth, from which the same was tumbled-down from the upper step of the grate and gradually worked its way to a small bottom flat grate. However, even when this furnace was provided with a roof which was dropped at the outlet in order to cause certain turbulence to achieve better admixture of fuel and air, the problem of practically unburned fine particles of fuel directed towards the combustion chamber of the associated boiler was still present and, consequently, the deposition of said partially burned fine particles on the walls, forming a very difficulty removable crust, remained as a problem even with the above described development. On the other hand, the stepped and inclined grates of this type of combustion chambers were not suitable for fuels with a high moisture content, whereby said furnaces were only of general use in countries wherein the moisture content of fuels was within the lower limits, for instance, Hawaii and the Philippines.

A further development was effected in the year of 1936 by George Ward and was patented by the Babcock & Wilcox Boiler Company. This development comprised a hearth furnace which for the first time constituted an integral part of the installation of a boiler instead of being a separate oven. This was accomplished by increasing the height of the boiler and using the floor space much more efficiently. The furnace comprised one or more cells, very similar to the Cook's cells but with the addition of cast iron hearth plates on which the cell rested. The bagasse was fed to the cells through feed chutes arranged at the front portion of the furnace and the back of the furnace was inclined inwardly thereof, through the use of a refractory suspension in order to again favor the admixing action of gases and fuel and as an aid to effect a combustion as complete as possible, by reflecting the heat again towards the fuel pile and shading the same from black surfaces. In the instance of the Ward furnace, the combustion air was forced inwardly and above the fuel cone through tuyeres located in the walls of the cell and at the cast iron hearth plates, from a plenum which totally surrounded the cell. A dumping hearth was arranged for reducing the labor and for avoiding dilution of cold air in the gases of the boiler and the cooling of refractory materials, whereas the ash was removed manually through a cleansing opening.

While this type of Ward cells constituted a great advance with respect to the fuel combustion technique for solid waste materials, it nevertheless did not accomplish a complete combustion of the fuel and the same problem persisted that the fine particles of said fuels passed in a very green stage towards the combustion chamber of the boiler and, consequently, heavy crusts and scale were formed as described above.

In U.S. Pat. No. 2,602,409 of July 8, 1952, E. L. Dennis described for the first time combustion cells uniformly distributed on the floor of the boiler and also for the first time describes, in said combustion cells, a plurality of tangential tuyeres distributed along the outlet opening of each cell in order to produce a great turbulence in the outlet gases and thus achieve a better combustion. Despite the fact that this was a great achievement with respect to the turbulence forming systems of the prior art burners, the problem caused by the fine particles of fuel that were not sufficiently burned before leaving the cells again persisted and, consequently, the heavy deposits of adherent materials on the walls of the combustion chamber of the associated boiler continued to exist, whereby this type of cells did not solve the above described particular problem.

In U.S. Pat. No. 2,754,778 of July 17, 1956, E. L. Dennis describes certain improvements effected in the burner cells of U.S. Pat. No. 2,602,409, with an attempt to improve the efficiency of combustion of the fine particles, such as pith, by the installation of two lines of tangential tuyeres, one directly above the radial tuyeres to burn the fuel pile and the other one situated, as in U.S. Pat. No. 2,602,409, in the throat of the cells. With the above, a higher turbulence was achieved which obviously tended to burn with a higher efficiency both the volatile materials and the fines or pith, which according to E. L. Dennis should be totally burned in the combustion chamber of the boiler which was also of an increased height in order to avoid the pith to reach the tubes or the walls of the boiler. However, while this new development avoided in a certain degree the incomplete combustion of fines from the solid fuel, as well as it removed the majority of the fines from the larger particles which remained in the burning pile, it nevertheless did not solve the above mentioned problem that, being the partially burned fuel material highly adherent, the same adhered to the walls both of the cells and the combustion chamber of the associated boiler, thus causing very heavy crusts which had to be removed frequently, with the consequent long and uneconomical stops of the furnace.

Finally, in Mexican Pat. No. 76,602, filed Feb. 15, 1963, Edwin L. Dennis describes a further improvement with respect to the burner cells of U.S. Pat. Nos. 2,602,409 and 2,754,778 mentioned above, which improvements reside only and exclusively in providing an additional throat having dimensions slightly smaller than the dimensions of the diameter of the chamber of the cell and in providing under each said throat, that is, the outlet throat of the cell and the additional throat, the above mentioned tangential tuyeres in order to cause a rotatory motion of the outlet gases which entrained the fines. However, this improvement did not achieve any result that may be regarded as different from those accomplished by the arrangement of U.S. Pat. No. 2,754,778, inasmuch as the provision of an intermediate throat has nothing to do whatsoever with the motion of the gases, which is caused exclusively by the provision of the tangential tuyeres.

In all the prior art apparatus, as it may now be clearly apparent, there is the serious problem that the combustion of the fines is absolutely incomplete and that the partially burned fines tend to adhere to the walls of the boilers and to the water tubes thereof, as well as to the walls of the burning cells, thereby considerably decreasing the efficiency thereof. The tangential air streams that were introduced by Dennis, do not solve the problem but, on the contrary, tend to aggravate the same, inasmuch as, when the gases are provided with a rotatory motion, the particles tend to be centrifugally displaced towards the periphery and adhere with more strength on the walls of the chamber, which are thereby considerably affected and must be cleansed very frequently. This has been a continuous and unsolved problem up to the present date in the prior art existing cells for burning solid waste fuel materials.

BRIEF SUMMARY OF THE INVENTION

Having in mind the defects of the prior art burning cells for solid waste fuel materials, it is an object of the present invention to provide a burning cell for solid waste fuel materials which is of a very simple construction and yet of a very high efficiency to accomplish the complete combustion of the fuel material and particularly of the fines thereof.

It is a further object of the present invention to provide a burning cell for solid waste fuel materials, of the above mentioned character, which will avoid any adherence of the fines removed from the combustion pile of such solid waste fuel materials, by very simple and economical means which also aid to the completeness of combustion.

A more particular object of the present invention is to provide a burning cell for solid waste fuel materials, of the above mentioned character, which by the mere expedient of suitably distributing the secondary combustion air streams, will accomplish a considerably increased combustion efficiency and will completely avoid the adherence of partially burned fines to the walls of the cell.

One more object of the present invention is to provide a burning cell of the above mentioned character which will be capable of burning any type of waste solid fuel materials, including bagasse having high moisture and pith contents.

One other and more particular object of the present invention is to provide a burning cell of the above mentioned nature, which will efficiently carry out the combustion reactions of the fine materials, at the same time preventing said fine particles from touching the walls of the cell and retaining the same during the period of time suitable to reduce its size until the sizing of the fines and the mechanics of the fluid may permit the exhaust of only very fine burning particles.

The foregoing objects and others ancillary thereto, are preferably accomplished as follows:

In accordance with a particularly preferred embodiment of the present invention, there is provided a burning cell comprising in combination a vertical lower cylindrical burning chamber for waste fuel, a vertical upper cylindrical burning chamber for fines, a horizontal partition separating said chambers, a reduced diameter opening centrally arranged in said partition between said two chambers, a horizontal roof on said upper chamber, a reduced diameter outlet opening centrally arranged in said roof, a horizontal bottom in said lower chamber, feed means for solid waste fuel material arranged for feeding said waste fuel in the said lower chamber to build up a waste fuel pile on the bottom thereof, a plurality of circumferential arrays of inwardly radially directed tuyeres arranged in the side wall of said lower chamber near the bottom thereof, first air feed means to blow air into said lower chamber through said radially directed tuyeres and against said waste fuel pile, at least a helical array of downwardly inwardly and sidewardly inclined tuyeres arranged in the cylindrical wall of said upper chamber, second air feed means to blow air into said upper chamber through said tuyeres, in order to produce an outer descending whirlpool of air which reverses direction at said partition to form a central ascending whirlpool of air between the centrally arranged reduced diameter opening of said partition and the centrally arranged reduced diameter opening of said roof, whereby the large particle fuel is totally burned in said pile in the lower chamber, whereas the partially burned fines are entrained by the air from the tuyeres of said lower chamber and are conveyed upwardly into the said central ascending whirlpool through said upper chamber, to furtherly burn said fines without any contact between said fines and the walls of said upper chamber.

BRIEF DESCRIPTION OF THE DRAWINGS

The novel features that are considered characteristic of the present invention are set forth with particularity in the appended claims. The invention itself, however, both as to its organization and its method of operation, together with additional objects and advantages thereof, will best be understood from the following description of a specific embodiment when read in connection with the accompanying drawings, in which:

DETAILED DESCRIPTION

Figure 1:
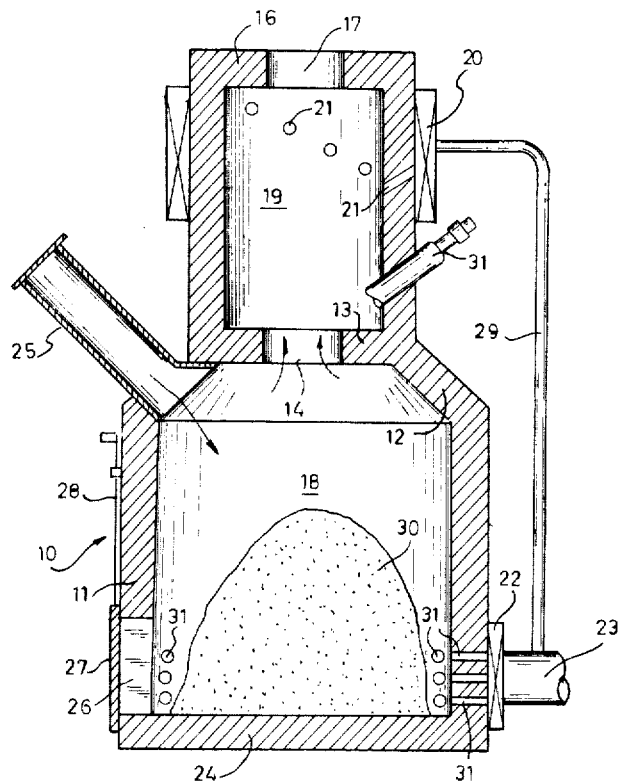
FIG. 1 is an elevational cross-sectional view of a burning cell for solid waste fuel materials built in accordance with the present invention.

Having now more particular reference to the drawings and more specifically to FIGS. 1 and 2 thereof, there is shown a burning cell built in accordance with the present invention, suitable for burning bagasse and similar materials, which will be described in terms of the burning of bagasse with high moisture and pith contents, as a particular preferred embodiment of the invention, but without in any respect meaning that the scope of the invention must be restricted exclusively to said embodiment, inasmuch as the cell in accordance with the present invention may be used to burn any type of solid waste fuel material, such as sawdust, wood shavings, wood mill wastes, coffee wastes, sugar cane bagasse as well as many other waste materials.

The bagasse burning cell in accordance with the embodiment particularly illustrated in the drawings, comprises a lower chamber 18 formed by a cylindrical wall 11, a frustoconical wall 12 at the open upper end of the cylindrical wall 11, a roof or partition 13 which is provided with a reduced diameter opening 14, and a bottom 24 for closing said chamber 18, and on which the pile 30 of bagasse is arranged to be burned.

Over the roof 13 of chamber 18 and as a continuation of the top of the frustoconical section 12 of said lower chamber, a second or upper chamber 19 is arranged, said chamber being formed by a cylindrical wall 15 of a diameter smaller than the cylindrical wall 11, a roof 16 having at its center a circular opening 17 and a bottom 13 which is the same as the roof of the lower chamber 18, thus constituting a partition dividing the cell of the present invention into said two chambers. All the said walls and members of the cell are built of a refractory material in order to preserve heat and to increase the efficiency of combustion, as well as in order to avoid exposure of the burning material 30 to black or heat absorbing surfaces that would decrease its temperature.

Figure 2:
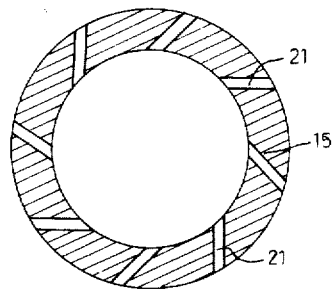
FIG. 2 is a conventional cross-sectional view to show the arrangement of the tuyeres of the upper chamber of the burning cell shown in FIG. 1.

The upper chamber 19 is provided with a plenum 20 to which air is fed through air duct 23, as well as with a plurality of tuyeres 21, directed inwardly downwardly and sidewardly as clearly indicated in FIGS. 1 and 2 of the drawings, preferably forming an angle with the horizontal of from about 10° to 75° and still more preferably of about 30°, in order to direct air streams inwardly and downwardly at said angle into the chamber 19. The tuyeres 21, such as more clearly illustrated in FIG. 2 of the drawings, are arranged approximately tangentially to the wall 15, thus forming an angle of from about 10° to 75°, preferably about 30° with respect to the radii of chamber 19, in order to blow tangential jets of air which, in view of the vertical inward inclination of the tuyeres, forms a whirlpool which completely downwardly sweeps all the inner surface of chamber 19, for a purpose which will be more clearly explained hereinbelow.

In the upper chamber 19 a burner for liquid or solid fuel schematically illustrated at 31 may be provided to aid in the combustion of fine particles entrained by the air as will be explained hereinafter.

The lower chamber 18 is provided with a chute 25 for feeding bagasse, which bagasse falls in the direction of the arrow shown in FIG. 1 of the drawings to maintain a waste fuel pile 30 on the bottom 24. The lower chamber 18 is also provided with an air plenum 22 fed by means of duct 23 from which a by-pass 29 is directed to feed air to plenum 20 of the upper chamber 19 and a plurality of arrays of radial tuyeres 21 are evenly distributed at the lower third of the cylindrical wall 11 of the lower chamber 18, in in order to blow air over the bagasse pile 30, said air streams effecting the combustion of said pile and at the same time entraining all the fines or pith of said bagasse, up to a certain predetermined size, upwardly and through the opening 14 of said chamber 18.

In order to remove from time to time the accumulated ash, an opening 26 is provided at the lower portion and next to the bottom 24 of wall 11 of chamber 18, said opening 26 being closed or opened by means of a damper 27 which may be operated by any suitable lifting or opening mechanism such as schematically illustrated at 28 in FIG. 1, in order to open the same when it is required to remove the accumulated ash, for which operation the air supply is closed to the tuyeres 31 and the pile 30 is permitted to burn completely, such that the ash may be properly removed and the bottom of the cell properly cleansed, with the purpose of restarting the autogenous combustion by virtue of the fact that the refractory materials of the walls will preserve sufficient heat for restoring said combustion.

Figure 3:
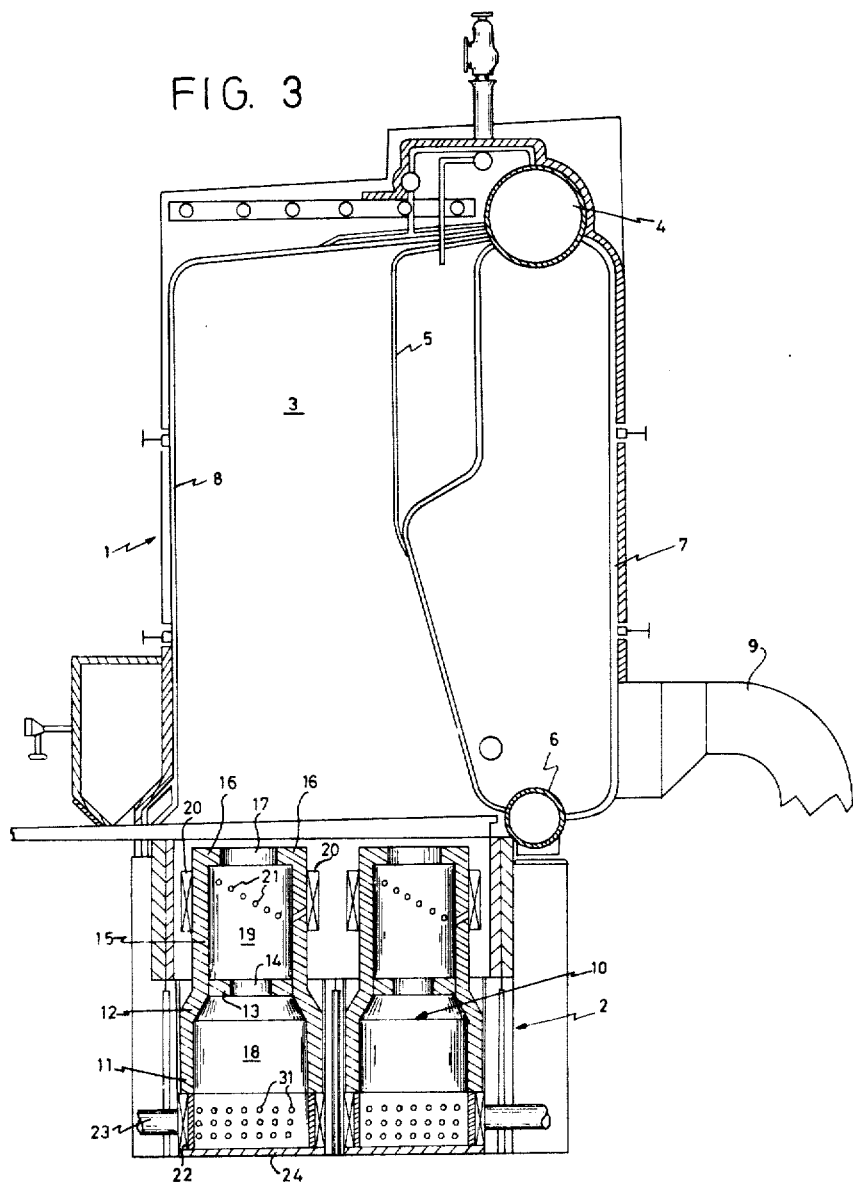
FIG. 3 is a cross-sectional elevational view of a boiler arrangement containing a plurality of burning cells built in accordance with the present invention.
Figure 4:
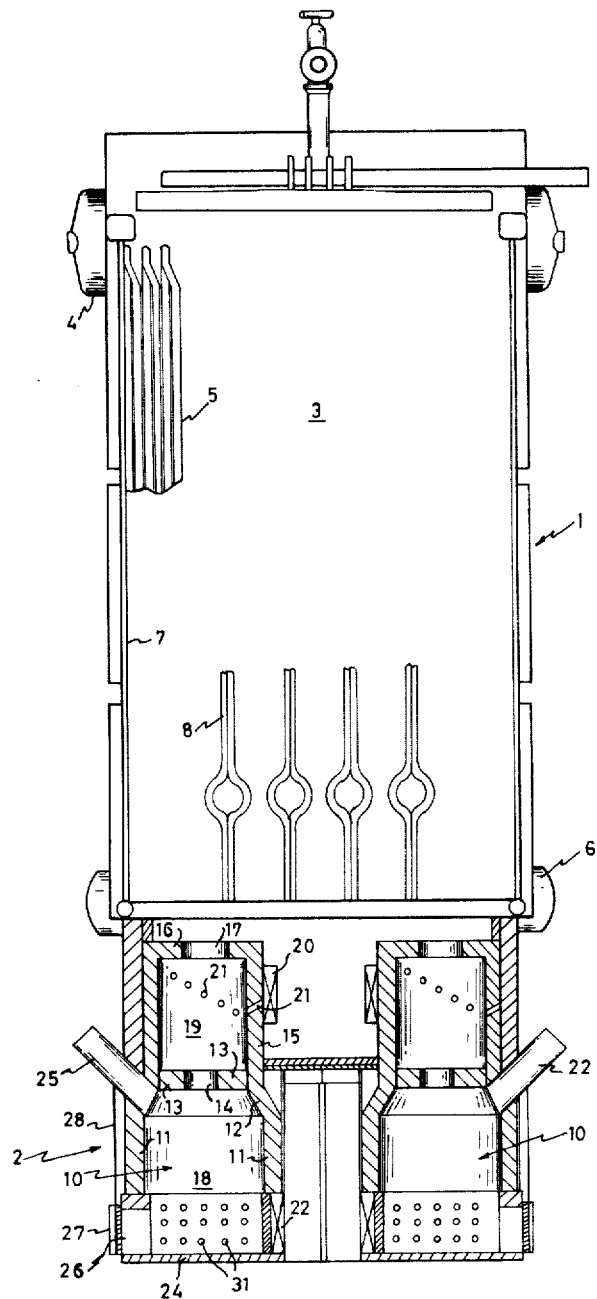
FIG. 4 is a cross-sectional elevational view of the boiler show in FIG. 3, taken at an angle of 90° with respect to the view of FIG. 3.
Figure 5:
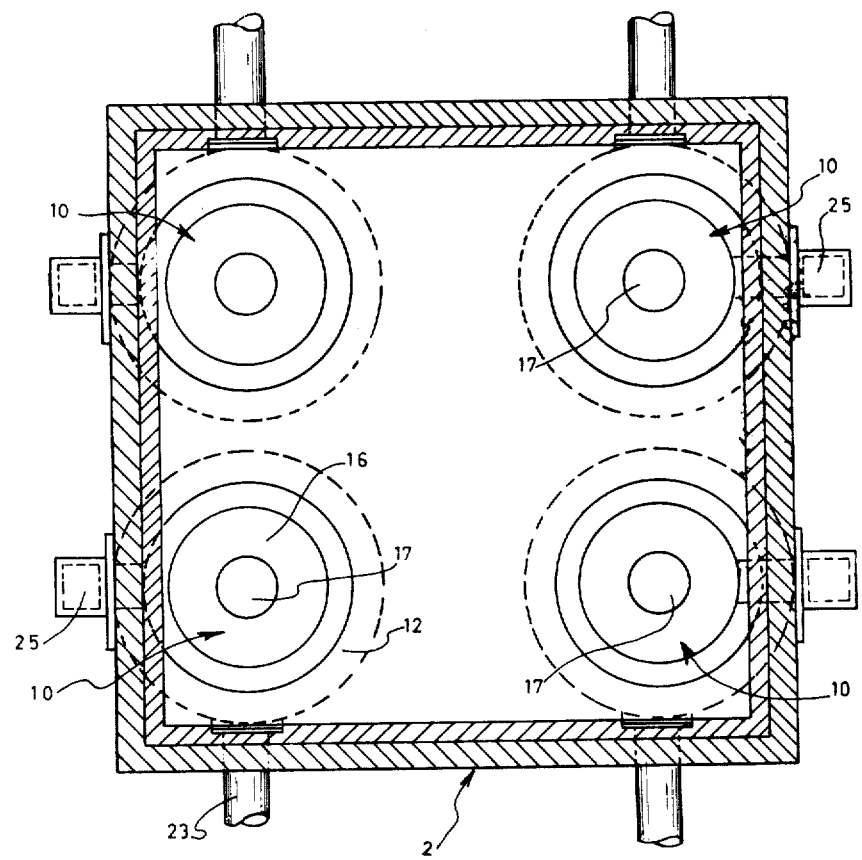
FIG. 5 is a top plan cross-sectional view, to show the arrangement of a plurality of burning cells built in accordance with the present invention, on the floor of a boiler.

Having now reference to FIGS. 3, 4 and 5 of the drawings, there is shown a particularly preferred application of the above described cells illustrated in FIGS. 1 and 2 of the drawings, which comprises a steam generator or boiler generally identified by means of the reference numeral 1, which comprises a lower zone 2 or hearth and an upper zone 3 which constitutes a secondary chamber, an upper dome 4, water pipes 5, a lower dome 6 communicated with dome 4 by means of said water pipes 5, a water wall 7 and a water wall 8 for purposes perfectly known in the art of steam generation, as well as an exhaust or chimeney 9 either with forced, induced or natural draft. In the furnace or lower combustion chamber 2, such as clearly illustrated in FIG. 5 of the drawings, a plurality of cells 10 built in accordance with the present invention may be arranged, for instance, four such cells, with the air inlets 23 located on the sides of the furnace and with the feed chutes 25 for bagasse located at the two complementary sides of said furnace.

Therefore, when it becomes necessary to turn out one of the cells for removal of ash according to the above, the operation may be effected in an alternate manner such that only one of the cells will be off whereas the other three will remain on, in order to give sufficient heat of combustion for the generation of steam without the need of stopping the operation of the boiler itself.

It may be more particularly seen in FIGS. 2 and 4 of the drawings, that the mixture of partially burned pith and air which is exhausted in the form of a high turbulent whirlpool through the openings 17 of the upper chambers 19 of the burning cells, is drastically expanded at chamber 3 of the boiler, whereby the very small particles of pith or bagasse under combustion, are completely burned in said chamber 3, and the particles exiting from openings 17 of the upper chambers 19 are so small that they are not capable of forming adherent layers that may form crusts or scale on the walls of the boilers or on the water pipes 5 thereof.

As mentioned above, chutes 25 for feeding bagasse with high pith contents, are arranged in an inclined position at the frustoconical portions 12 of the lower chamber 18, such that the air which enters through the tuyeres 21 will entrain the pith and will extract the same prior to forming the fuel pile 30, as shown by means of the arrows in FIG. 1 through the opening 14 in order to reach chamber 19. In said chamber 19, a peripheral descending air whirlpool has already been created by the air fed through the inclined tangential tuyeres 21, which materially sweeps the interior of chamber 19 and said whirlpool reverses its direction when it reaches floor 13 of said chamber 19, whereby an ascending whirlpool of a dimeter approximately the same as that of the openings 14 and 17 of chamber 19 is formed, in order to entrain within said inner whirlpool the particles of burning pith which are thereby kept fully spaced from the wall 15, the turbulence created by said whirlpool being such that the particles are retained a period of time sufficient to achieve an almost complete combustion, whereby said pitch particles entrained in the air whirlpool through the opening 17, are discharged to the boiler with a sizing of suitable characteristics to be burned in an almost instantaneous manner in chamber 3 of the boiler, without causing the traditional problems of scaling or crusts that were suffered by using the burning cells of the prior art.

On the other hand, as the pith particles under combustion do not touch any of the walls of chamber 19, and still preserve sufficient weight when in the chamber 18, said particles will not be capable of adhering to walls 11, 12 or 15 of the burning cell, whereby the latter is maintained clean and it does not become necessary to effect stops for cleaning the walls as was the case with the prior art cells. In other words, at the lower chamber 18, the ascending streams of air which entrain the unburned entering pith will cause the initiation of combustion of said pith but will entrain the same upwardly to chamber 19, whereby the pith particles will have no time to adhere to walls 11 and 12. The pith particles, being fastly burned at chamber 19, will tend to adhere to the wall 15, roof 16 and opening 17 of said chamber, but they do not actually adhere thereto by virtue of the fact that they are being entrained within an ascending central whirlpool which maintains the same totally spaced from the inner surface of chamber 19, in view of the descending peripheral whirlpool caused by the streams of air blown through the helical array of tangential tuyeres 21 as described above.

It may be seen from the above that for the first time a burning cell for solid waste fuel materials has been provided which has a highly increased efficiency as compared to all the prior art cells in order to achieve a complete combustion of the fuel and particularly the fines, and at the same time completely avoids contact of the fines under combustion with the walls of the cell, thus producing particles under combustion which are so fine when they leave the cell that the same are burned in a practically instantaneous manner in the expansion chamber of the boiler associated therewith, whereby the fuel is burned in a complete manner and its heat is totally used in the generation of steam or in the carrying out of any other desired operations.

As an additional advantageous feature, the a burner 31 may be optionally provided for burning gaseous or liquid fuels, in order to discharge directly into the ascending inner whirlpool carrying the fine particles, whereby this burner will aid in the complete combustion of fine particles to take advantage of its heat of combustion, which is used in an integral manner in the apparatus with which the burner cell is associated.

Although in the above certain specific embodiments of the present invention have been shown and described, it is to be understood that many modifications thereof are possible. The present invention, therefore, is not to be restricted except insofar as is necessitated by the prior art and by the spirit of the appended claims.

What is claimed is:

1. A burning cell for solid waste fuel materials which comprises in combination a vertical lower cylindrical burning chamber for waste fuel, a vertical upper cylindrical burning chamber for fines, a partition separating said chambers, a reduced diameter opening centrally arranged in said partition between said two chambers, a roof on said upper chamber, a reduced diameter outlet opening centrally arranged in said roof, a bottom in said lower chamber, feed means for solid waste fuel material arranged for feeding said waste fuel in the said lower chamber to build up a waste fuel pile on the bottom thereof, a plurality of circumferential arrays of inwardly radially directed tuyeres arranged in the side wall of said lower chamber near the bottom thereof, first air feed means to blow air into said lower chamber through said radially directed tuyeres and against said waste fuel pile, a helical array of downwardly inwardly and sidewardly inclined tuyeres arranged in the cylindrical wall of said upper chamber, second air feed means to blow air into said upper chamber through said tuyeres to produce an outer descending whirlpool of air which reverses direction at said partition to form a central ascending whirlpool of air between the centrally arranged reduced diameter opening of said partition and the centrally arranged reduced diameter opening of said roof, whereby the large particle fuel is totally burned in said pile in the lower chamber, and the partially burned fines are entrained by the air from the tuyeres of said lower chamber and are conveyed upwardly into the said central ascending whirlpool through said upper chamber, to more thoroughly burn said fines while preventing sufficient contact between said fines and the walls of said upper chamber to cause said fines to stick to the walls of said upper chamber.

2. A burning cell according to claim 1 wherein the angles of inclination of the tuyeres of said upper chamber, the pitch angle of the helical array of said tuyeres and the tangential angle of said tuyeres with respect to the radii of the cylindrical side wall of the upper chamber, are of from about 10° to about 75°, preferably of about 30°.

3. A burning cell according to claim 1 wherein said upper and said lower chambers are cylindrical and said lower chamber has a frustoconical upwardly converging wall between said cylindrical wall and said partition.

4. A burning cell according to claim 3 wherein the cell is constructed of a refractory material in order to maintain the heat within the same.

5. A burning cell according to claim 1 wherein said upper chamber is provided with an auxiliary fluid fuel burner, inwardly and downwardly directed and with its mouth directly discharging within said central ascending whirlpool of air, in order to achieve a more complete combustion of the fines entrained within said upper chamber.

6. A burning cell according to claim 5, wherein the angle of inclination of said auxiliary burner is of from about 10° to about 75°, preferably of about 30°.

7. A burning cell according to claim 1 wherein said cell is associated with a steam generator having a high boiler setting to receive the admixture of gases and burning particles in order that the combustion of said particles be essentially complete before any partially burned particle may reach any operative surface of the steam generator.

8. A burning cell according to claim 7 wherein a plurality of said burning cells are arranged on the floor of the steam generator in order to produce a sufficient amount of heat for steam generation.

9. A burning cell according to claim 1 wherein said first and said second air feed means comprise air plenums surrounding at least a part of each one of said upper and lower chambers.

10. A burning cell according to claim 1 wherein said lower chamber is provided with a side opening closed by a damper for purposes of periodical removal of ash and cinders.

11. A burning cell for solid waste fuel materials comprising:
- a lower cylindrical burning chamber;
- an upper cylindrical burning chamber having a centrally oriented outlet opening in the upper interior surface;
- a partition separating said upper chamber from said lower chamber and having a centrally oriented outlet opening;
- means for introducing solid waste fuel material to the lower chamber;
- a plurality of circumferential arrays of internally radially directed tuyeres situated in the wall of said lower chamber;
- a first air feed means for feeding air into said lower chamber via said radially directed tuyeres;
- a helically oriented array of tuyeres located on the peripheral wall of said upper chamber, each of said tuyeres being directed downward inward and sideward with respect to said peripheral wall;
- a second air feed means for feeding air into said upper chamber via said helically oriented array of tuyeres.

* * * * *